May 31, 1949. P. H. E. CLAESSON 2,471,411
REACTOR
Filed Jan. 16, 1945 2 Sheets-Sheet 1
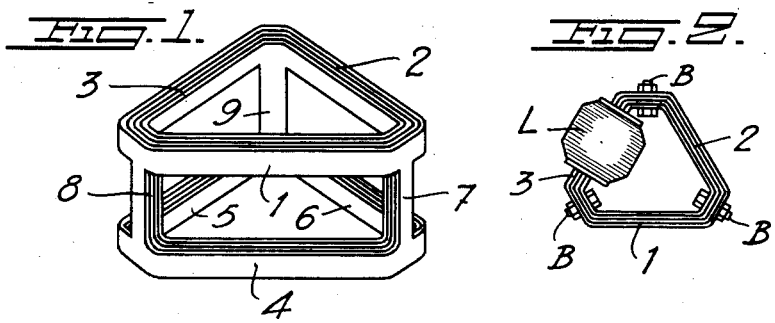
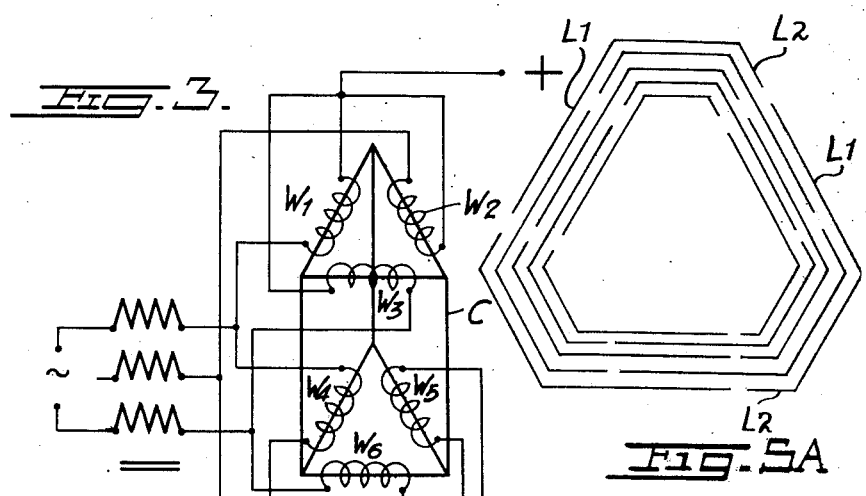
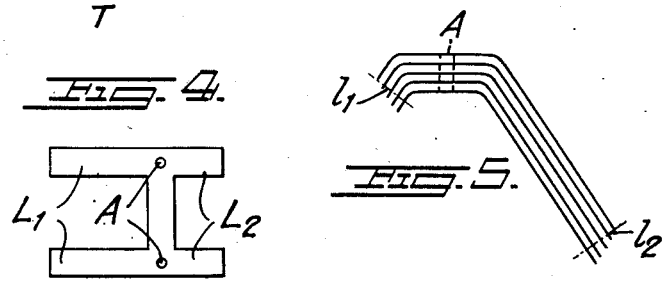
Inventor

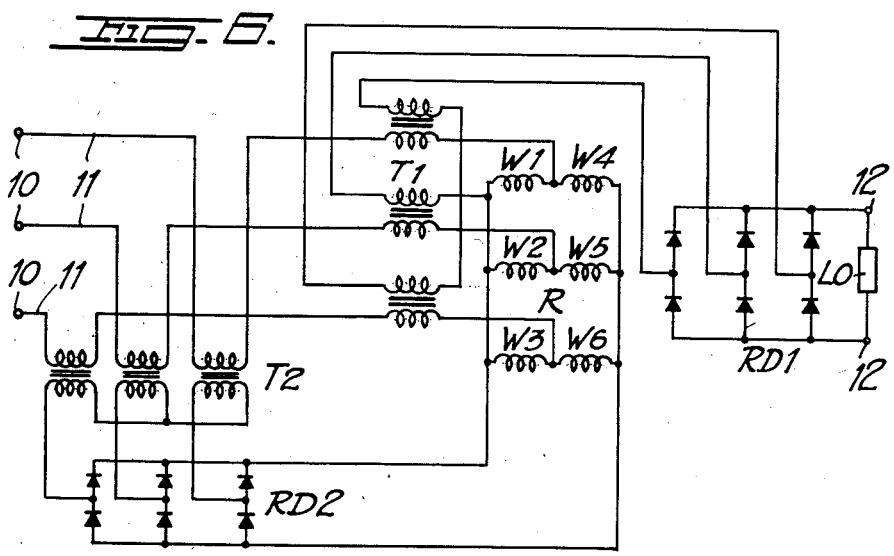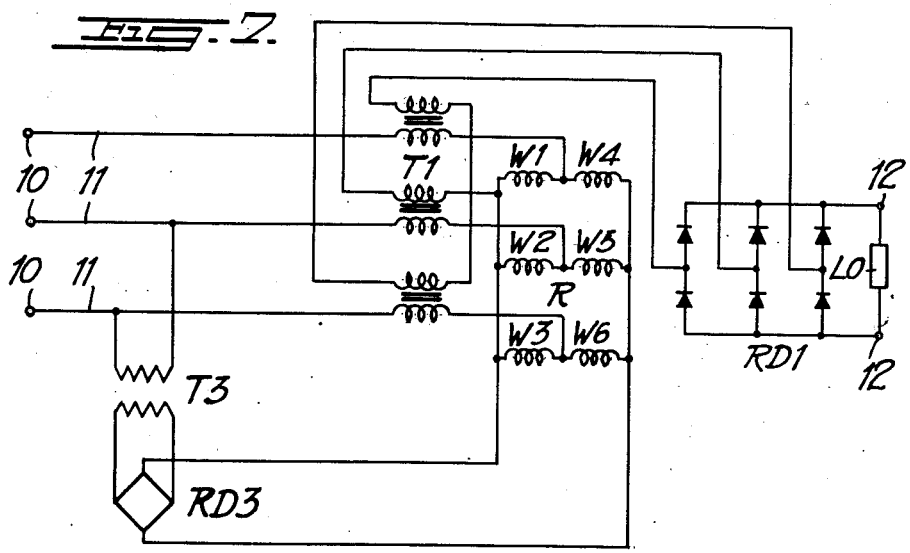

Patented May 31, 1949

2,471,411

UNITED STATES PATENT OFFICE 2,471,411

REACTOR

Per Harry Elias Claesson, Jakobsberg, Sweden

Application January 16, 1945, Serial No. 573,098
In Sweden September 17, 1943

Section 1, Public Law 690, August 8, 1946
Patent expires September 17, 1963

6 Claims. (Cl. 171—242)

This invention relates to direct current controlled reactors, commonly referred to as saturable core choke coil devices, particularly for use in voltage or current regulation or control systems.

One object of the invention is to provide a reactor of this type for multiphase current forming a single mechanical and magnetic unit.

Another object of the invention is to reduce the iron losses and the consumption of material in reactors of this type.

Still another object of the invention is to provide a reactor of this type having fully symmetrical paths of flux.

The invention consists in the construction and novel combination and arrangement of elements hereinafter fully described, illustrated in the accompanying drawings and pointed out in the claims hereunto appended.

On said drawings:

Fig. 1 is a perspective view of a reactor core for three-phase current constructed according to my invention.

Fig. 2 is a top plan view of said core and one of its associated windings.

Fig. 3 illustrates diagrammatically my improved reactor core with associated windings and a preferred circuit arrangement for supplying alternating and direct currents thereto.

Fig. 4 is a top plan view of a lamination used in building up my improved reactor core.

Fig. 5 shows a pack of core laminations formed by suitably bending laminations of the type illustrated in Fig. 4 and combined to form one-third of my improved reactor core.

Fig. 5A is a top plan view of the core showing how the bent laminations form the lap joints.

Fig. 6 is a circuit diagram of a voltage regulation system using my improved saturable core reactor.

Fig. 7 is a circuit diagram of a current regulation system incorporating my improved saturable core reactor.

As may be seen from Fig. 1 the core shown therein and adapted for use with three-phase current may be considered to consist of two triangular paths of flux 1-2-3 and 4-5-6 respectively interconnected by three core parts 7, 8 and 9. Separate or common windings may be used for the direct and alternating currents and in the former case the direct current windings are mounted on the core parts 1-3 inclusively and/or 4-6 inclusively as illustrated generally in Fig. 2 for one winding/whereas the alternating current windings either are placed on the same core parts as the direct current windings or on the core parts 7, 8 and 9. The alternating current windings as well as the direct current windings are preferably mutually equal. If windings are mounted on the core parts 1, 2 and 3 as well as on the core parts 4, 5 and 6 the only point of importance is that the windings of equal kind surrounding the triangular paths of flux are mutually equal for each such path of flux.

The mode of operation will first be explained assuming that the reactor is provided with three direct current windings and three alternating current windings mounted on the core parts 1-3 inclusively. The direct current windings shall then act in equal direction so that a direct flux corresponding to the sum of the ampere-turns of these windings is produced in the path of flux 1-2-3. As the direct current windings have been assumed to be substantially equal obviously no direct flux is produced in the core parts 7, 8 and 9 and 4, 5 and 6. The alternating current windings may be arranged in star or delta connection taking into consideration that the fluxes produced by these windings will present mutually correct phase displacement (120°). Now as the instantaneous values of the ampere-turns of the alternating current windings are mutually unequal in the various windings the A. C. flux will branch over the core parts 7, 8 and 9 as well as 4, 5 and 6. Thus, the paths of flux 1-7-4-8, 2-9-6-7 and 3-8-5-9 will correspond to the different phases. Consequently one part of the path of flux (the core parts 7, 8 and 9) is common to each pair of phases. Although the different partial alternating fluxes thus are mutually dependent they balance one another in equally loaded phases so that the sum of the alternating flux components in the core parts 1, 2, 3 and 4, 5, 6 respectively always will be substantially equal to zero. Thus, the alternating voltages induced in the direct current windings will substantially neutralize each other so that no alternating current of fundamental frequency will arise in the direct current circuit.

Similar conditions will be obtained when the alternating current windings are situated on the core parts 7, 8 and 9 and also when the core parts 4, 5 and 6 too are provided with direct and/or alternating current windings. In the latter case the alternating current windings situated on the core parts 7, 8 and 9 obviously are to be so connected in circuit that they cooperate with the alternating current windings on the core parts 1, 2 and 3 in producing the fluxes in the paths of flux 1-7-4-8, 2-9-6-7 and 3-8-5-9.

When using common windings for the direct and alternating current the reactor can be arranged in the general manner illustrated in Fig. 3.

The core C is here purely diagrammatically shown and provided with windings W1–W6 inclusively. Windings W1, W2 and W3 form together a star connection and W4, W5 and W6 another star connection. The free ends of the phase windings of the two star connections are in pairs connected in parallel to the respective line phases while the two neutral points are each connected to one terminal of a source of direct voltage. In order that correct paths of flux may be obtained it is necessary that the ampere-turns of the windings act in such direction that the alternating fluxes in the upper and lower core parts are oppositely directed. The remaining conditions will be quite analogous to those described with reference to Fig. 1, however, with the difference that current superposition is used instead of ampere-turn superposition.

Such a circuit arrangement is particularly useful in regulating systems in which the reactor is energized by a direct current dependent on the magnitude of the alternating current flowing through the reactor. In order that in this case the direct and alternating currents may be galvanically separated outside the reactor which is necessary to prevent the transmission of direct current to the alternating current circuit or inversely said alternating current dependent direct current is derived from the secondary winding of a transformer T connected in the line phases as may be seen more clearly from the circuit diagram illustrated in Fig. 6 explained below in greater details.

In said figure, 10 represents the terminals of a source of three-phase current connected by conductors 11 to the primary of three-phase transformer T1 the secondary of which over rectifier device RD1 is connected to terminals 12 of load LO. Connected in each conductor 11 is the primary of transformer T2 which over rectifier device RD2 supplies direct current to my improved reactor R (the core of which for the sake of simplicity is omitted) whereas alternating current is applied to reactor R over primary of transformer T1 substantially as described with reference to Fig. 3.

The operation of the voltage regulation system in Fig. 6 may briefly be explained as follows:

Upon a variation of load LO, for instance resulting in a decrease of the voltage across terminals 12, the alternating current through primary of transformer T1 and windings W1—W6 inclusively of reactor R increases. Consequently also the alternating current through primary of transformer T2 increases. Now by suitable choice of the ratio of transformer T2 this increase of the primary alternating current may be used to increase the direct current from rectifier device RD2 to windings W1–W6 inclusively of reactor R so as to decrease the impedance thereof (which depends on the direct and alternating currents in the reactor coils) by such an amount that the voltage across terminals 12 is restored.

In the regulation system illustrated in Fig. 7 a constant direct current is supplied to the reactor R over transformer T3 and rectifier device RD3 whereby the current through load LO for reasons well known in the art of direct current controlled reactors is held approximately constant in spite of variations of the voltage across terminals 12 in response to variations of load LO.

As may be seen from the description of the paths of flux of the reactor such paths are formed around the triangular circuits (1, 2, 3 and 4, 5, 6 respectively) as well as therebetween over the vertical legs (7, 8 and 9 in Fig. 1). For this reason any joints in the core C should present lowest possible magnetic resistance and thus preferably be made as lap joints. The core is, therefore, preferably composed of laminations L having the form illustrated in Fig. 4. A number of laminations L necessary for obtaining suitable thickness of the core C may then be superimposed and bent so as to obtain the shape shown in Fig. 5. Three groups of laminations having been bent in this manner the core is formed by introducing the long legs L1 of the laminations into the coil frames for the windings which in this case are assumed to be mounted only on the horizontal core parts (1, 2, 3 and/or 4, 5, 6 in Fig. 1). The laminations are mounted layer after layer in such a manner that the long legs L1 of each lamination will abut against the short legs L2 of the next lamination as shown in Fig. 5a. In order that lap joints may be produced the legs L1 for each layer are alternately introduced from opposite sides of the coil frames. As may easily be seen legs L1 and/or L2 of the laminations shall be shorter the nearer the centre of the core the laminations are situated. However, all of the laminations to begin with are preferably made equal and adjusted to the correct lengths only after the laminations have been bent in that the ends of the groups of laminations are cut off preferably at right angles along the lines $l_1$ and $l_2$ in Fig. 5. The core is held together by bolts B extending through apertures A in the laminations.

The reactor above described is adapted for use with three-phase current. Reactors made in quite analogous manner according to the invention may, however, also be constructed for any higher number of phases. The number of vertical legs (7, 8 and 9 in Fig. 1) will then be increased to a number corresponding to the number of phases and the number of windings increased correspondingly.

The embodiments above described are merely to be considered as examples chosen for explaining the invention and can obviously be varied and modified in many different ways without departing from the basic inventive idea.

What I claim is:

1. A direct current controlled reactor for multiphase current, comprising a saturable core composed of sections forming two closed paths of flux situated in two planes in combination with a plurality of legs connecting respective junctions of adjoining sections of one path with corresponding junctions of the other path, the number of sections being the same for each path, whereby there are formed a plurality of quadrangles each including a pair of legs and a section of each path, a plurality of alternating current phase windings each arranged on one side of a respective quadrangle whereby an alternating flux is induced in said sections and legs, and a plurality of direct current windings arranged on respective sections of at least one of said paths in such a manner that the unidirectional fluxes produced thereby add in the direction of said path but substantially cancel in each of said legs.

2. A direct current controlled reactor for multiphase current, comprising a saturable core composed of sections forming two closed paths of flux situated in parallel planes in combination with a plurality of transverse legs connecting respective junctions of adjoining sections of one path with corresponding junctions of the other path, the number of said legs and the number of sections per path corresponding to the number of phases of the multiphase current, whereby there are formed a plurality of rectangles each including a pair of legs and a section of each path, a plurality of alternating current phase windings each arranged on one side of a respective rectangle whereby an alternating flux is induced in said sections and legs, said windings being energized in such phase relationship that the vector sum of alternating fluxes in each of said paths is substantially zero, and a plurality of direct current windings arranged on respective sections of at least one of said paths in such a manner that the unidirectional fluxes produced thereby add in the direction of said path but substantially cancel in each of said legs.

3. A direct current controlled reactor for multiphase current, comprising a saturable core composed of sections forming two closed paths of flux situated in two planes in combination with a plurality of legs connecting respective junctions of adjoining sections of one path with corresponding junctions of the other path, the number of junctions being the same for each path, whereby there are formed a plurality of quadrangles each including a pair of legs and a section of each path, a plurality of windings adapted to induce magnetic flux in said quadrangles including a number of windings energized by direct current and arranged on respective sections of at least one of said paths in such a manner that the unidirectional fluxes produced thereby add in the direction of said path but substantially cancel in each of said legs, and means including at least some of the windings of said plurality of windings for inducing alternating currents of different phase in respective ones of said quadrangles.

4. A reactor as claimed in claim 10 wherein two sets of star-connected windings are respectively arranged on the sections of the first and the second path, corresponding windings in said two paths having their outer free ends connected in pairs to respective phases of a source of multiphase current and being arranged in such a manner that the alternating fluxes are oppositely directed in each of said two paths, the neutral points of said star connections being connected to the terminals of a source of direct current.

5. A direct current controlled reactor for multiphase current comprising a saturable core composed of sections forming two closed paths of flux situated in parallel planes in combination with a plurality of transverse legs connecting respective junctions of adjoining sections of one path with corresponding junctions of the other path, each path having the general shape of a regular polygon with the number of its sides corresponding to the number of phases of the multiphase current, whereby there are formed a plurality of rectangles each including a pair of legs and a side of each polygon, a plurality of windings adapted to induce magnetic flux in said rectangles including a number of windings energized by direct current and arranged on respective sides of at least one of said polygons in such a manner that the unidirectional fluxes produced thereby add in the direction of said polygon but substantially cancel in each of said legs, and means including at least some of the windings of said plurality of windings for inducing alternating currents of different phase in respective ones of said rectangles.

6. A reactor as claimed in claim 5 wherein said saturable core is composed of generally I-shaped sections of lamination of which the transverse parts which project at one side are longer than the oppositely transverse parts, the abutments of the sections of each lamination being staggered relative to the corresponding abutments of an adjoining lamination.

PER HARRY ELIAS CLAESSON.

REFERENCES CITED

The following references are of record in the file of this patent:

UNITED STATES PATENTS

| Number | Name | Date |
|---|---|---|
| 515,020 | Riker | Feb. 20, 1894 |
| 1,360,462 | Stoekle | Nov. 30, 1920 |
| 1,935,426 | Acly | Nov. 14, 1933 |
| 2,086,120 | Croden | July 6, 1937 |
| 2,212,543 | Jovy | Aug. 27, 1940 |
| 2,219,182 | Granfield | Oct. 22, 1940 |
| 2,330,824 | Granfield | Oct. 15, 1943 |
| 2,374,059 | Wentz | Apr. 17, 1945 |